(12) United States Patent
MacDonald et al.

(10) Patent No.: US 9,854,730 B2
(45) Date of Patent: Jan. 2, 2018

(54) SEED INDUCTOR BOX FOR AN AGRICULTURAL IMPLEMENT HAVING A FLUIDIZATION CHAMBER

(71) Applicant: CNH Industrial Canada, Ltd., Saskatoon (CA)

(72) Inventors: Grant T. MacDonald, Ames, IA (US); Chad M. Johnson, Arlington Heights, IL (US); Scott A. Long, Plainfield, IL (US); David D. Flamme, Winfield, IL (US); Martin J. Roberge, Saskatoon (CA); Marvin A. Prickel, Homer Glen, IL (US); Michael J. Connors, Lockport, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/885,253

(22) Filed: Oct. 16, 2015

(65) Prior Publication Data

US 2016/0037712 A1    Feb. 11, 2016

Related U.S. Application Data

(62) Division of application No. 13/737,861, filed on Jan. 9, 2013, now Pat. No. 9,192,093.

(51) Int. Cl.
*A01C 7/08* (2006.01)

(52) U.S. Cl.
CPC .............. *A01C 7/084* (2013.01); *A01C 7/081* (2013.01); *A01C 7/082* (2013.01)

(58) Field of Classification Search
CPC ......... A01C 7/081; A01C 7/082; A01C 7/084; A01C 7/08; A01C 7/00; A01C 7/10
USPC .................................... 111/175, 174; 406/118
See application file for complete search history.

(56) References Cited

U.S. PATENT DOCUMENTS

| | | | |
|---|---|---|---|
| 5,161,473 A | 11/1992 | Landphair et al. | |
| 5,392,722 A | 2/1995 | Snipes et al. | |
| 6,253,693 B1 | 7/2001 | Mayerle et al. | |
| 6,290,433 B2 | 9/2001 | Poncelet et al. | |
| 6,668,738 B2 | 12/2003 | Lee et al. | |
| 7,182,029 B2 | 2/2007 | Johnson et al. | |
| 7,267,061 B2 | 9/2007 | Mayerle | |
| 8,234,987 B2 | 8/2012 | Georgison et al. | |
| 9,192,093 B2 * | 11/2015 | MacDonald | A01C 7/081 |
| 2010/0326339 A1 | 12/2010 | Georgison et al. | |

* cited by examiner

*Primary Examiner* — Christopher J. Novosad
(74) *Attorney, Agent, or Firm* — Rebecca L. Henkel; Rickard K. DeMille

(57) ABSTRACT

A particulate material delivery system for an agricultural implement including, an inductor box configured to receive particulate material from a tank, the inductor box comprising at least one inductor segment configured to guide the particulate material and an airflow through the inductor box, wherein the at least one inductor segment comprises a particulate material fluidization chamber configured to establish a vortex that mixes the particulate material with the airflow.

15 Claims, 6 Drawing Sheets

SEED INCTOR BOX FOR AN AGRICULTURAL IMPLEMENT HAVING A FLUIDIZATION CHAMBER

CROSS-REFERENCE TO RELATED APPLICATION

This application is a divisional of U.S. patent application Ser. No. 13/737,861, entitled "SEED INDUCTOR BOX FOR AN AGRICULTURAL IMPLEMENT HAVING A FLUIDIZATION CHAMBER", filed Jan. 9, 2013, which is herein incorporated by reference in its entirety.

BACKGROUND

The invention relates generally to ground working equipment, such as agricultural equipment, and more specifically, to an inductor box for a pneumatic distribution system of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

BRIEF DESCRIPTION

In one embodiment, a particulate material delivery system for an agricultural implement including, an inductor box configured to receive particulate material from a tank, the inductor box comprising at least one inductor segment configured to guide the particulate material and an airflow through the inductor box, wherein the at least one inductor segment comprises a particulate material fluidization chamber configured to establish a vortex that mixes the particulate material with the airflow.

In another embodiment, a particulate material delivery system for an agricultural implement including, an inductor box including an air supply chamber configured to receive an airflow from an airflow source, and an inductor segment in fluid communication with the air supply chamber, including, a particulate material supply chamber configured to receive particulate material from a tank and the airflow from the air supply chamber, a particulate material fluidization chamber configured to receive the particulate material and the airflow from the particulate material supply chamber and to create a vortex that mixes the particulate material with the airflow, and a particulate material delivery chamber configured to receive the particulate material from the particulate material fluidization chamber and the airflow from the air supply chamber, wherein the airflow conveys the particulate material to a particulate material distribution system.

In a further embodiment, a particulate material delivery system for an agricultural implement including, an inductor segment of an inductor box including, a particulate material supply chamber configured to receive particulate material from a particulate material tank and airflow from an air supply chamber, a particulate material fluidization chamber configured to receive the particulate material and the airflow from the particulate material supply chamber and to create a vortex that mixes the particulate material with the airflow, and a particulate material delivery chamber configured to receive the particulate material from the particulate material fluidization chamber and the airflow from the air supply chamber, wherein the airflow delivers the particulate material to a particulate material distribution system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
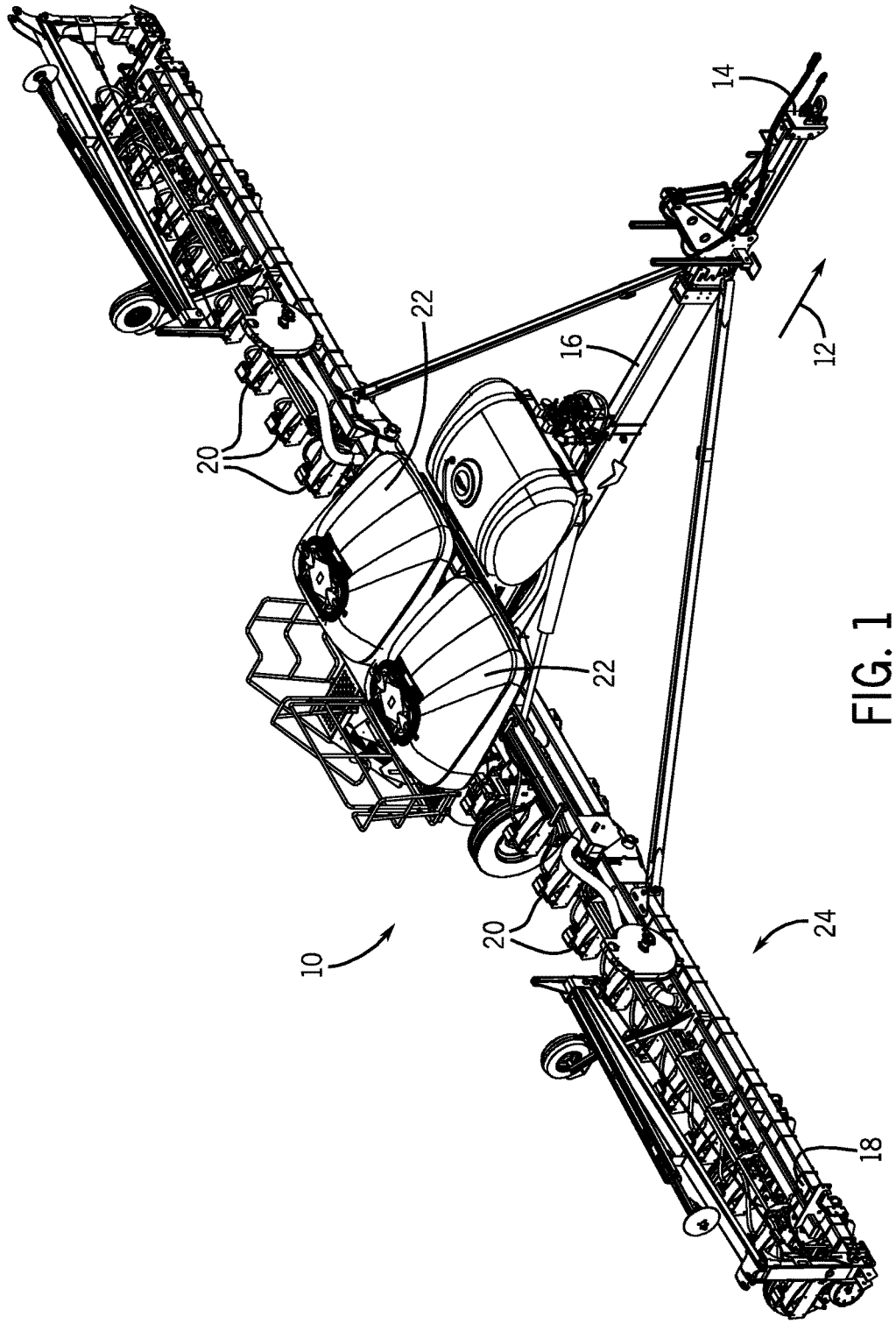
FIG. 1 is a perspective view of an embodiment of an agricultural implement configured to deposit particulates into a soil surface.

FIG. 1 is a perspective view of an embodiment of an agricultural implement 10 configured to deposit particulate material into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit particulate material (e.g., seeds) at a desired depth beneath the soil surface, thereby establishing rows of planted seeds. The implement 10 also includes particulate material tanks 22, and a pneumatic distribution system 24 configured to convey particulate material from the tanks to the row units 20. In certain embodiments, the pneumatic distribution system includes an inductor box positioned beneath each particulate material tank 22. Each inductor box is configured to receive particulate material from a respective tank, to fluidize the particulate material into an air-particulate material mixture, and to distribute the air-particulate material mixture to the row units 20 via a network of pneumatic hoses/conduits (i.e., the pneumatic distribution system 24).

In certain embodiments, each row unit 20 includes a residue manager, an opening assembly, a particulate material tube, closing discs, and a press wheel. The residue manager includes a rotating wheel having multiple tillage points or fingers that break up crop residue, thereby preparing the soil for particulate material deposition. The opening assembly includes a gauge wheel and an opener disc. The gauge wheel may be positioned a vertical distance above the opener disc to establish a desired trench depth for particulate material deposition into the soil. As the row unit travels across a field, the opener disc excavates a trench into the soil for particulate material deposition. The particulate material tube, which may be positioned behind the opening assembly, directs a particulate material from a metering system into the excavated trench. The closing discs then direct the excavated soil into the trench to cover the planted particulate material. Finally, the press wheel packs the soil on top of the particulate material with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

As mentioned above, the pneumatic distribution system 24 includes an inductor box configured to receive particulate material (e.g., seeds) from a respective tank. Depending on the desired application, the pneumatic distribution system may distribute a wide variety of seeds (e.g., light seeds, heavy seeds, large seeds, small seeds, etc). The inductor box fluidizes particulate material from a tank 22 into an air-particulate mixture for distribution to the row units 20 through a network of pneumatic hoses/conduits. More specifically, the inductor box includes a fluidization chamber configured to fluidize the particulate material for delivery through the pneumatic distribution system 24 to the row units 20. The fluidization chamber is configured to create a vortex that induces particulate material to churn within the fluidization chamber. The churning of particulate material within the fluidization chamber drives the particulate material into constant motion. As a result, the particulate material fluidization chamber reduces air pocket formations in seed supply that can stall seed delivery; and particulate material surges that may otherwise overfill mini-hoppers on the row units, plug pneumatic hoses, or plug the inductor box. Accordingly, the reliability of particulate material flow through the implement 10 is increased, thereby reducing maintenance and equipment downtime.

Figure 2:
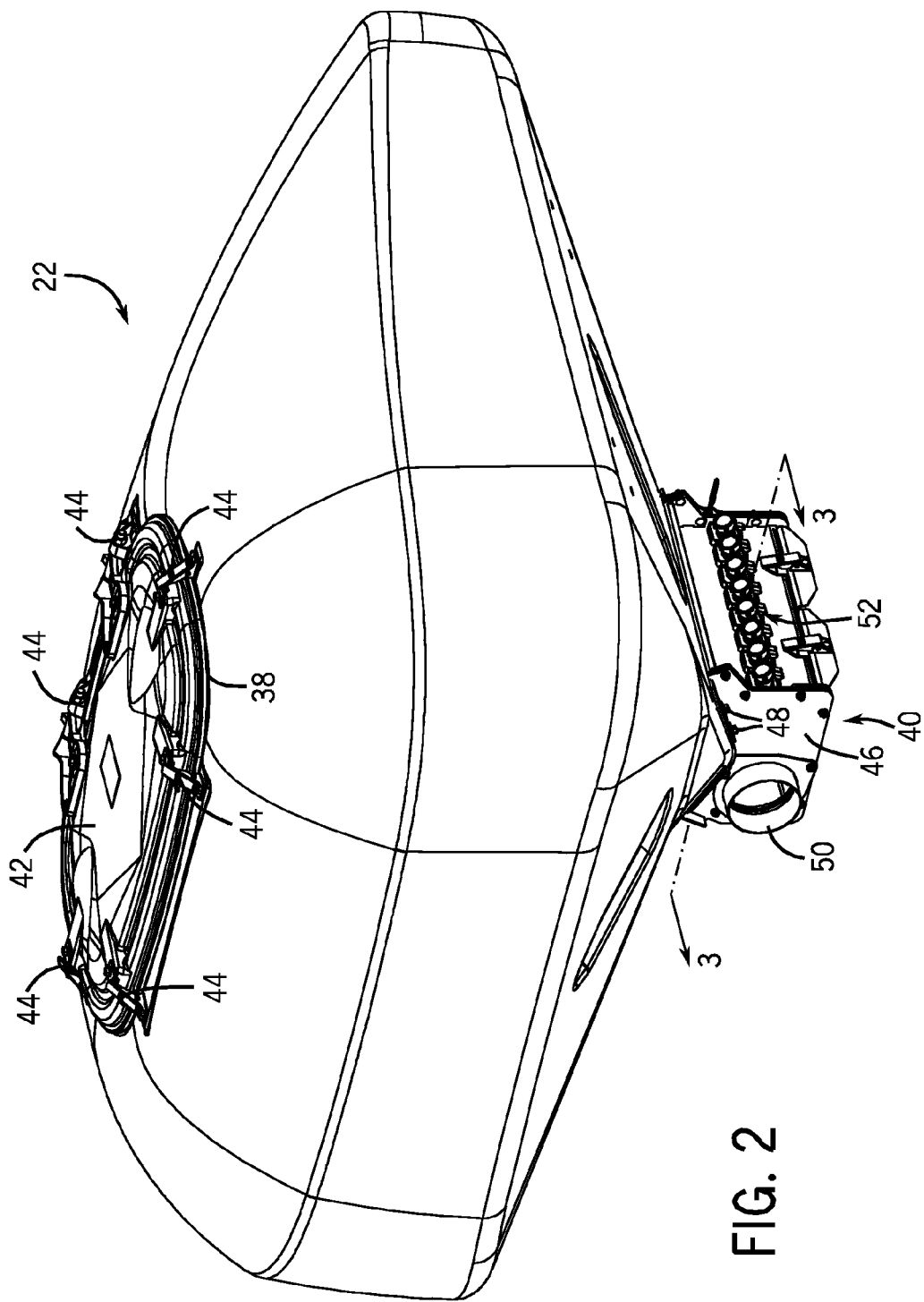
FIG. 2 is a perspective view of an embodiment of a particulate material tank coupled to an inductor box.
Figure 3:
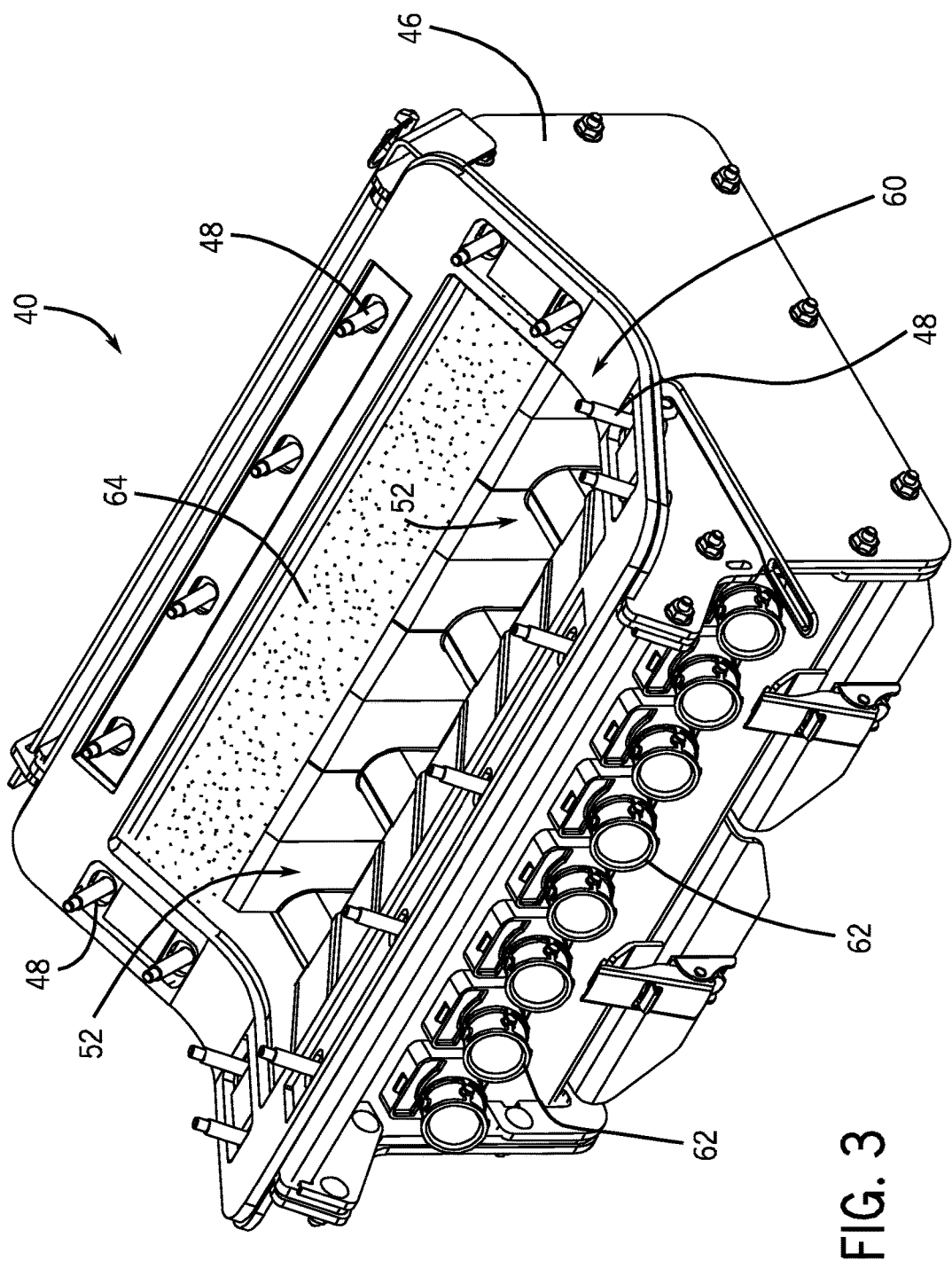
FIG. 3 is a perspective view of an embodiment of an inductor box.
Figure 4:
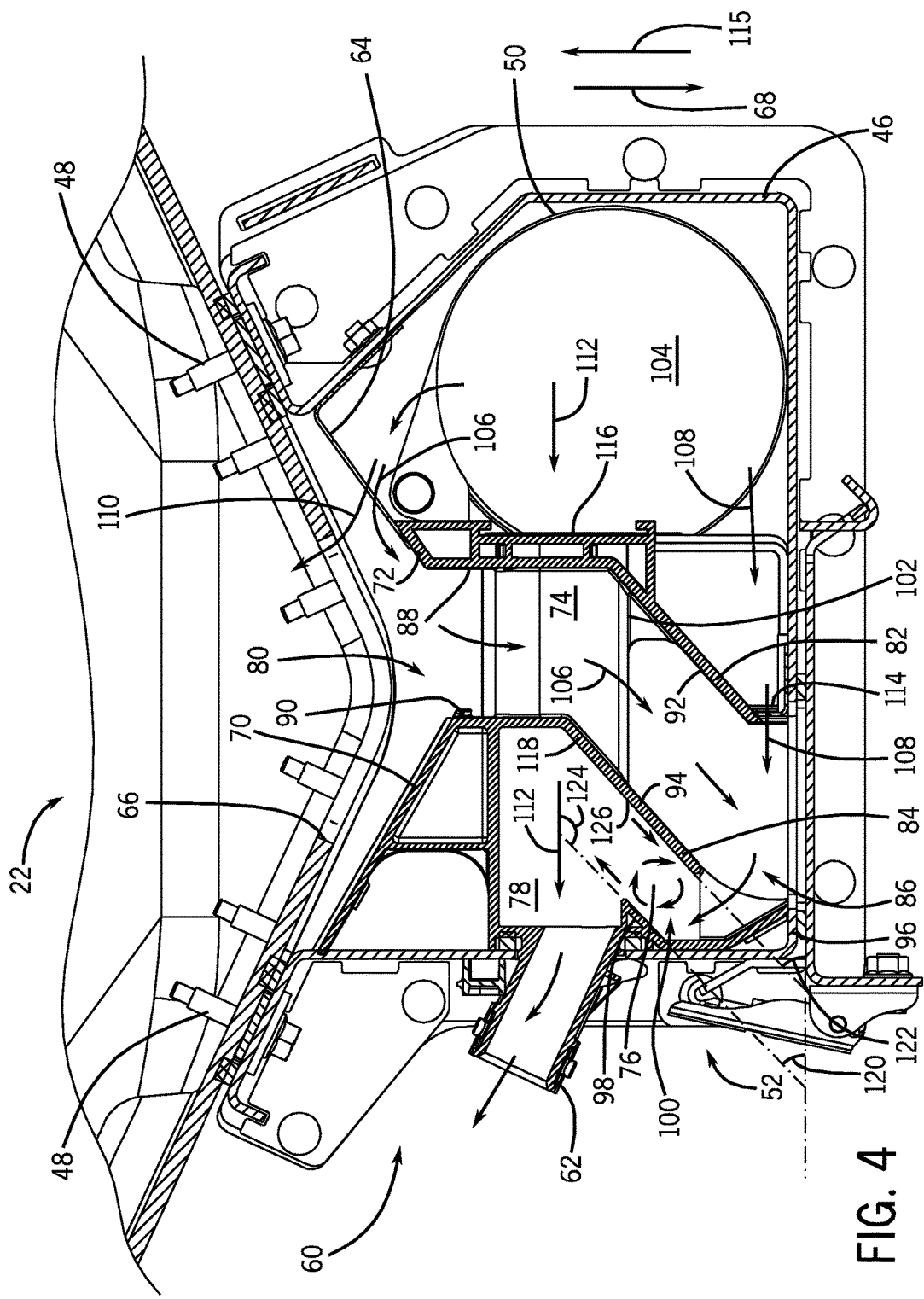
FIG. 4 is a cross-sectional side view of an embodiment of an inductor box.
Figure 5:
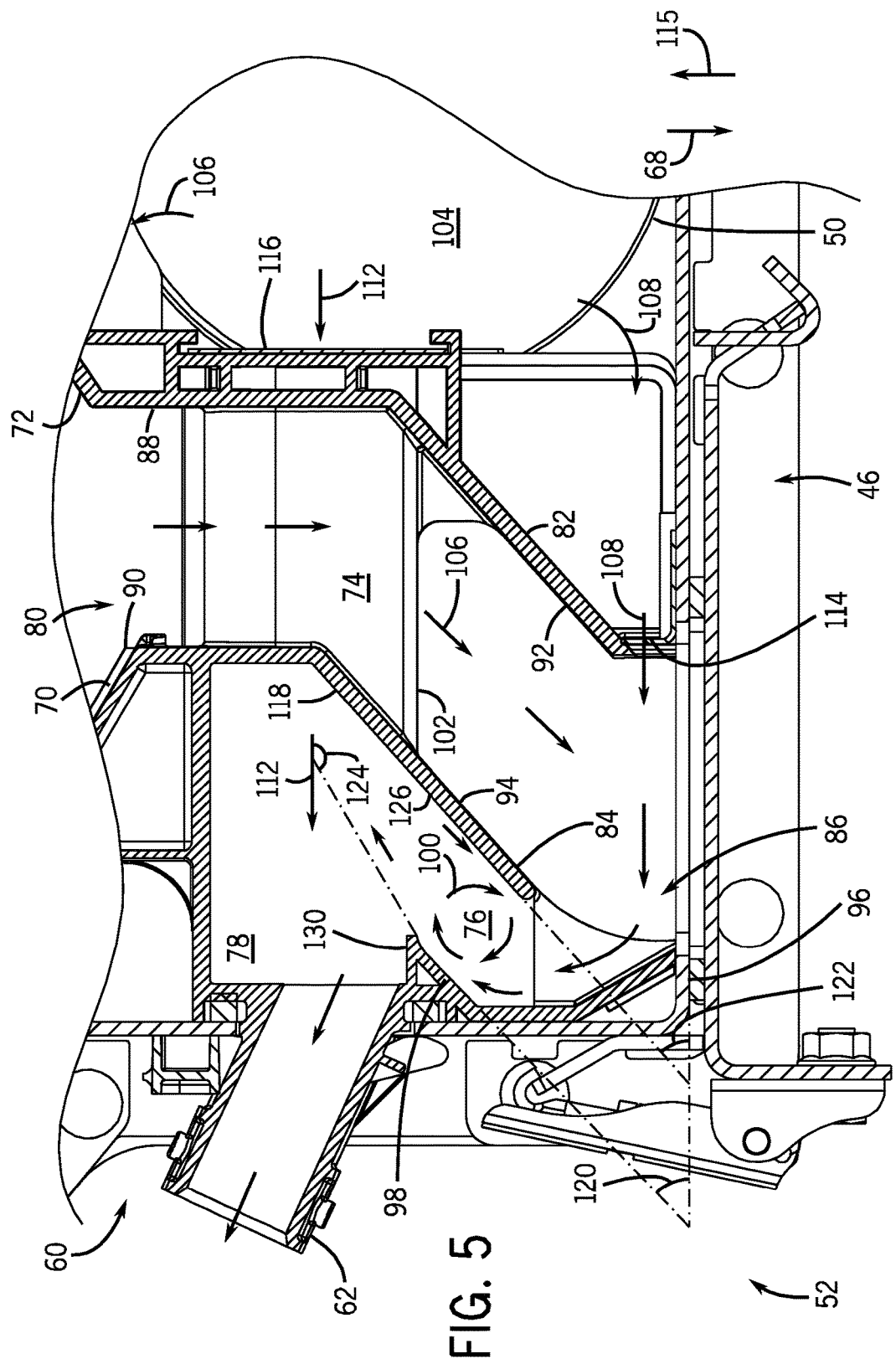
FIG. 5 is a cross-sectional side view of another embodiment of an inductor box.
Figure 6:
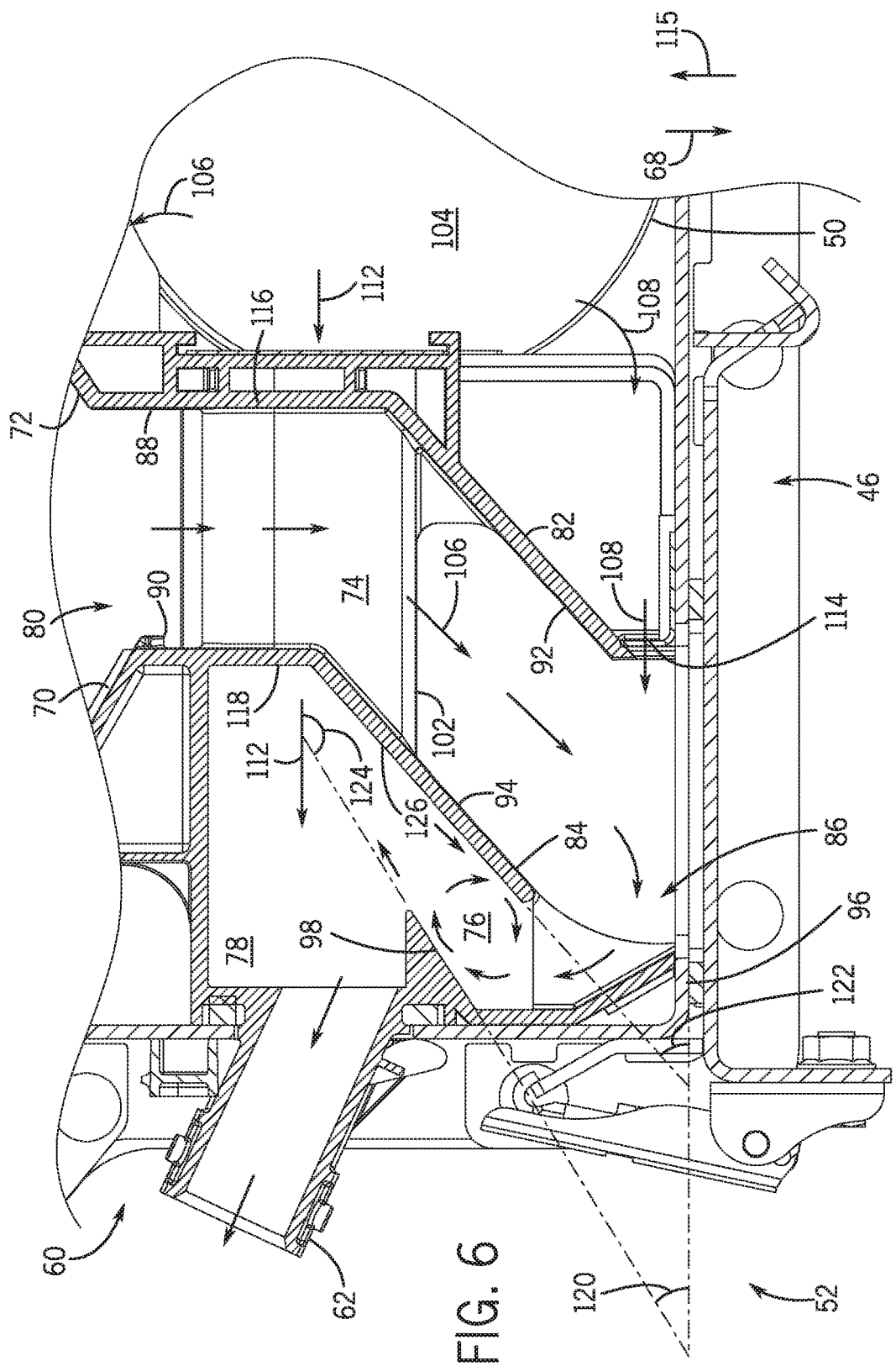
FIG. 6 is a cross-sectional side view of a further embodiment of an inductor box.

FIG. 2 is a perspective view of an embodiment of a particulate material tank 22 coupled to an inductor box 40. The particulate material tank 22 includes an opening 38 for receiving particulate material (e.g., seeds, etc.) for storage in the tank. The tank 22 secures the particulate material inside using a lid 42 that selectively covers the opening 38. The lid 42 securely attaches to the tank 22 with multiple fasteners 44. On the opposite side of the tank 22 from the lid is the inductor box 40. The inductor box 40 attaches to the bottom of the tank 22 and receives gravity fed particulate material for fluidization. The inductor box 40 includes a housing 46 that is coupled to the tank 22 with bolts 48. In addition, the inductor box 40 includes an air supply port 50, and multiple inductor segments 52. It is through the air supply port 50 that the inductor box 40 receives airflow from an air supply (e.g., a fan, a blower, etc.). The airflow from the air supply enables the inductor box 40 to fluidize the particulate material and to pressurize the tank 22. In some embodiments, the tank 22 may be made of a flexible material that expands when pressurized with airflow from the air supply. As will be explained in greater detail below, the inductor box 40 directs airflow from the air supply through a series of air pathways to the inductor segments 52, and into the tank 22. The inductor segments 52 fluidize the particulate material with the airflow in the fluidization chamber to facilitate delivery to the row units 20.

FIG. 3 is a perspective view of an embodiment of an inductor box 40. As illustrated, the inductor box 40 includes multiple inductor segments 52 disposed within a chamber 60 formed by the inductor box housing 46. In the illustrated embodiment, there are eight inductor segments 52. However, other embodiments may include a different number of inductor segments 52 (e.g., 1, 2, 3, 4, 5, 6, 7, 8, 9, 10, or more). As mentioned above, the particulate material enters the inductor segments 52 from the tank where the particulate material is fluidized (i.e., mixed with air in the fluidization chamber). Once the particulate material is fluidized, the air-particulate material mixture exits the inductor box 40 through particulate material delivery ports 62 in the inductor segments 52.

FIG. 4 is a cross-sectional side view of an embodiment of an inductor box 40 coupled to the tank 22. As illustrated, the inductor box 40 is coupled to the tank 22 with bolts 48. The inductor box 40 surrounds a particulate material outlet(s) 66 of the tank 22, thereby enabling particulate material to exit the tank 22 and enter the inductor box 40. More specifically, as the particulate material exits the tank 22, in direction 68, the particulate material enters the inductor segment(s) 52. As explained above, the inductor box 40 includes an inductor segment 52 disposed within the inductor box chamber 60. The top of the inductor segment 52 includes two surfaces 70 and 72. The surfaces 70 and 72 may be angled to facilitate flow of particulate material into the inductor segment 52. As particulate material travels through the inductor segment 52, the particulate material passes through a series of chambers before exiting through the particulate material delivery port 62. The chambers in the inductor segment 52 include a particulate material supply chamber 74, a fluidization chamber 76, and a particulate material delivery chamber 78.

The angled surfaces 70 and 72 channel the particulate material from the tank 22 into the particulate material supply chamber 74 through a particulate material supply chamber inlet 80. The particulate material supply chamber 74 guides the particulate material from the particulate material supply chamber inlet 80 to the particulate material supply chamber outlet 86 via a first wall 82 and a second wall 84. As illustrated, the walls 82 and 84 include respective vertical portions 88 and 90, as well as respective angled portions 92 and 94. As the particulate material flows through the particulate material supply chamber 74, the angled portions 92 and 94 of the walls 82 and 84 direct the particulate material toward the particulate material supply chamber outlet 86 at a base 96 of the inductor box 40.

Airflow from the air supply then conveys the particulate material through the particulate material supply chamber outlet 86 and into the fluidization chamber 76. The fluidization chamber 76 includes a first wall 98 and shares the second wall 84 of the particulate material supply chamber 74. The fluidization chamber 76 uses the first wall 98 and the second wall 84 of the particulate material supply chamber 74 to produce a vortex 100. The vortex 100 breaks up and fluidizes the particulate material before the particulate material enters the particulate material delivery chamber 78. In the particulate material delivery chamber 78, airflow from the bypass channel 102 along with air from the fluidization chamber conveys the particulate material out of the particulate material delivery chamber 78, through the particulate material delivery port 62, and to the row units 20.

As explained above, the inductor box 40 includes the air supply port 50 for receiving airflow from an air supply that pressurizes the tank 22 and conveys the particulate material through the inductor segment 52. The airflow from the air supply passes through the air supply port 50 and into an air supply chamber 104. The air supply chamber 104 extends through the inductor box 40 in a generally perpendicular direction to the flow path of the particulate material through the inductor segments 52, thereby supplying each inductor segment 52 with the airflow.

The air supply chamber 104 divides the airflow from the air supply into four airflow paths numbered 106, 108, 110, and 112. The first airflow path 106 passes through a first screen 64 and enters the particulate material supply chamber 74. As illustrated, the first screen 64 enables airflow to exit the air supply chamber 104, while simultaneously blocking particulate material from entering the air supply chamber 104, thus reducing maintenance costs and/or the duration of maintenance operations. As the airflow through the first airflow path 106 enters the particulate material supply chamber 74, the airflow engages the particulate material and urges the particulate material in the direction 68. For example, when using light particulate material (e.g., sweet corn seeds, sunflower seeds, etc.), the airflow through the airflow path 106 reduces the possibility of blockage of the particulate material supply chamber 74 by providing additional force (in addition to gravity) to move the particulate material through the particulate material supply chamber 74.

While the airflow through the first airflow path 106 facilitates urging the particulate material in the direction 68 through the particulate material supply chamber 74, the airflow through the second airflow path 108 conveys the particulate material out of the particulate material supply chamber 74 and into the fluidization chamber 76. The airflow through the second airflow path 108 flows through a second screen 114. The second screen 114 is coupled to the first wall 82 and the base 96 of the inductor box 40. The second screen 114, like the first screen 64, blocks the particulate material from entering the air supply chamber 104. Thus, the first screen 64 and the second screen 114 reduce maintenance costs/duration by blocking particulate material flow into the air supply chamber 104.

A third airflow path 110 flows through the first screen 64 and into the tank 22. The airflow in the third airflow path 110 pressurizes and expands the tank 22. However, in some embodiments, the lid 42 may not create a fluid-tight seal with the tank 22. Accordingly, airflow in the third airflow path 110 may provide continuous airflow into the tank 22 to replace pressurized air lost through leaks in the lid 42. As a result, airflow from the first airflow path 106 is able to flow through the particulate material supply chamber 74, and the airflow in the second airflow path 108 is able to convey the particulate material into the fluidization chamber 76. In other words, the airflow in the third airflow path 110 pressurizes the tank 22, thus equalizing pressure within the system. As a result, backdrafts (i.e., airflow) in direction 115 from the second airflow path 108 into the tank 22 are substantially reduced or eliminated. Moreover, the airflow through the third airflow path 110 reduces or eliminates backflowing airflow through the inductor segment 52 when the air supply shuts down. As explained above, the airflow through the third airflow path 110 pressurizes and expands the tank 22. When the air supply shuts down the pressurized air from the tank 22 travels through the path of least resistance to escape the tank 22. In the present embodiment, a portion of the airflow venting from the tank 22 passes through the first screen 64 and into the air supply chamber 104. As a result, the possibility of pressurized air in the tank 22 backflowing through the air bypass channel 102 (and carrying particulate material with it) is substantially reduced. Specifically, airflow through the first screen 64 may reduce or eliminate pressurized airflow (carrying particulate material with it) from passing through the particulate material supply chamber 74, through the fluidization chamber 76, through the particulate material delivery chamber 78, through the air bypass channel 102, and into the air supply chamber 104. Accordingly, the first airflow path 106 enables pressurized air to escape the tank 22, thus, substantially reducing or eliminating fluidized particulate material flow through the air bypass channel 102.

The airflow in the fourth airflow path 112 flows from the air supply chamber 104 through the air bypass channel 102 and into the particulate material delivery chamber 78. The air bypass channel 102 is disposed within the particulate material supply chamber 74 and extends between the first particulate material supply chamber wall 82 and the second particulate material supply chamber wall 84. The walls 82 and 84 include respective apertures 116 and 118 that enable the airflow of the fourth airflow path 112 to pass through the air bypass channel 102. The air bypass channel 102 is oriented in a generally crosswise direction relative to the particulate material supply chamber inlet 80, and in a generally parallel direction relative to the seed delivery port 62. Moreover, the air bypass channel 102 is positioned above the fluidization chamber 76, thereby enabling the airflow from the fourth airflow path 112 to convey the particulate material exiting the fluidization chamber 76 into the particulate material delivery port 62 for delivery to the row units 20.

As explained above, the fluidization chamber 76 is configured to create a vortex 100 that breaks up and fluidizes particulate material for transport to the particulate material delivery chamber 78. The fluidization chamber 76 forms the vortex 100 between the walls 98 and 84. As illustrated, the arrangement of the walls 98 and 84 blocks particulate material from traveling directly through the fluidization chamber 76 and into the particulate material delivery chamber 78, in the direction 115. More specifically, the walls 98 and 84 form respective angles 120 and 122 with the base 96 of the inductor box 40, thus blocking straight vertical movement of the particulate material. In the present embodiment, the angles 120 and 122 are approximately 43.9 and 41.8 degrees respectively, thus establishing a nearly parallel relationship between the walls 98 and 84. In other embodiments, the walls 98 and 84 may be oriented at different angles 120 and 122 (e.g., 25, 30, 35, 40, 45, 50, 55, 60, or more degrees). In still other embodiments, the wall 98 may curve and contact the base of the inductor box 40.

During operation, as particulate material enters the fluidization chamber 76, the particulate material contacts the wall 98. The wall 98 then guides the particulate material at the angle 120 toward the particulate material delivery chamber 78. If the airflow through the fluidization chamber is sufficient, the material will then enter the particulate material delivery chamber 78. As the particulate material enters the particulate material delivery chamber 78, it contacts air flowing through the air bypass channel 102, which carries the particulate material out of the particulate material delivery chamber 78, and to the row units 20. However, the particulate material exiting the fluidization chamber 76 enters the particulate material distribution chamber 78 at an obtuse angle 124 with respect to the fourth airflow path 112. The interaction between the airflow/particulate material from the fluidization chamber 76 and the airflow of the fourth airflow path 112 may block some of the airflow/particulate material from flowing back through the fourth airflow path 112. The particulate material/airflow that does not enter the fourth airflow path 112 flow along the wall 84 in the direction 68. More specifically, the particulate material that does not enter the fourth airflow path 112 contacts the surface 126 of the wall 84. The angle 122 of the wall 84 enables the particulate material to slide along the surface 126 in the direction 68 until the particulate material is again picked up by airflow of the second airflow path 108 and recirculated into the fluidization chamber 76. As more particulate material enters the vortex 100, the particulate material is forced out of the fluidization chamber 76 and into the particulate material delivery chamber 78. In this manner, the vortex 100 separates and mixes the particulate material with airflow. As explained above, the vortex 100 induces particulate material to churn, which keeps particulate material in constant motion. As a result, the particulate material fluidization chamber 76 reduces air pocket formations in seed supply that can stall seed delivery; and particulate material surges that may otherwise overfill mini-hoppers on the row units, plug pneumatic hoses, and/or plug the inductor box. Accordingly, the reliability of particulate material flow through the implement 10 is increased, thereby reducing equipment maintenance and downtime.

FIG. 5 is a cross-sectional side view of another embodiment of an inductor box 40 with a fluidization chamber 76. As explained above, the fluidization chamber 76 is configured to create a vortex 100 between the walls 98 and 84 to break up and fluidize particulate material for delivery to the particulate material delivery chamber 78. In the present embodiment, the wall 98 includes a protrusion 130 to facilitate creation of the vortex 100. The protrusion 130 projects into the fluidization chamber 76, thereby urging the particulate material and the airflow to flow toward the wall 84. More specifically, the protrusion 130 increases the obtuse angle 124 at which the particulate material and the airflow from the fluidization chamber 76 merges with the airflow path 112. Accordingly, the protrusion 130 may further decrease airflow and particulate material flow into the fourth airflow path 112. The particulate material and the airflow that does not enter the fourth airflow path 112 contacts the wall 84. The wall 84 then guides the airflow and the particulate material in the direction 68 back into the fluidization chamber 76, thereby forming the vortex 100. As a result, the fluidization chamber 76 induces the particulate material to churn within the vortex 100, thus reducing particulate material surges that may otherwise overfill mini-hoppers on the row units, plug pneumatic hoses, and/or plug the inductor box. Accordingly, the reliability of particulate material flow through the implement 10 is increased, thereby reducing equipment maintenance and downtime.

FIG. 6 is a cross-sectional side view of a further embodiment of an inductor box 40 with a fluidization chamber 76. As explained above, the fluidization chamber 76 is configured to create a vortex 100 between walls 98 and 84, which breaks up and fluidizes particulate material for delivery to the particulate material delivery chamber 78. The walls 98 and 84 form respective angles 120 and 122 with the base 96 of the inductor box. Depending on the embodiment, the angles 120 and 122 may vary. In the present embodiment, the angle 120 is less than the angle 122, but in other embodiments, the angle 122 may be less than or equal to the angle 120. As illustrated, the angle 120 of the wall 98 determines the angle 124 at which the airflow/particulate material from the fluidization chamber 76 intersects the fourth airflow path 112. More specifically, a reduction in the angle 120 increases the angle 124, while an increase of the angle 120 decreases the angle 124. As explained above, in the illustrated embodiment, the angle 120 is less than the angle 122, thus the angle 120 of the wall 98 may further decrease airflow/particulate material flow into the fourth airflow path 112. The particulate material and the airflow that does not enter the fourth airflow path 112 contacts the wall 84. The wall 84 then guides the airflow and the particulate material in the direction 68 back into the fluidization chamber 76, thereby forming the vortex 100. As a result, the fluidization chamber 76 induces the particulate material to churn within the vortex 100, thus reducing particulate material surges that may otherwise overfill mini-hoppers on the row units, plug pneumatic hoses, and/or plug the inductor box. Accordingly, the reliability of particulate material flow through the implement 10 is increased, thereby reducing equipment maintenance and downtime.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A particulate material delivery system for an agricultural implement comprising:

an inductor box configured to receive particulate material from a tank, the inductor box comprising at least one inductor segment configured to guide the particulate material and an airflow through the inductor box, the inductor box comprising:

a particulate material supply chamber configured to receive the particulate material;

a particulate material delivery port configured to guide the particulate material into a conduit; and a particulate material fluidization chamber comprising a first wall adjacent to the particulate material delivery port and a second wall, separate from the first wall, adjacent to the particulate material supply chamber, and wherein the particulate material fluidization chamber is configured to establish a vortex that mixes the particulate material with the airflow.

2. The particulate material delivery system of claim 1, wherein the at least one inductor segment comprises a particulate material delivery chamber, and wherein the particulate material fluidization chamber is positioned between the particulate material supply chamber and the particulate material delivery chamber or the particulate material delivery port.

3. The particulate material delivery system of claim 1, wherein the first wall is opposite the second wall, and wherein the first and second walls are configured to direct the particulate material and the airflow to create the vortex in the particulate material fluidization chamber that mixes the particulate material and the airflow.

4. The particulate material delivery system of claim 1, wherein the first wall is parallel to the second wall.

5. The particulate material delivery system of claim 1, wherein the first wall is oriented at an acute angle with respect to the second wall.

6. The particulate material delivery system of claim 1, wherein the first wall comprises a protrusion.

7. The particulate material delivery system of claim 1, wherein the first wall includes a curved portion that contacts a base of the inductor box.

8. The particulate material delivery system of claim 1, wherein the second wall is configured to guide the particulate material into the vortex in the particulate material fluidization chamber.

9. The particulate material delivery system of claim 1, wherein the second wall of the particulate material fluidization chamber at least partially defines the particulate material supply chamber.

10. A particulate material delivery system for an agricultural implement comprising:
an inductor box comprising:
an inductor segment comprising:
a particulate material supply chamber configured to receive particulate material from a tank and an airflow;

a particulate material delivery port configured to guide the particulate material into a conduit; and a particulate material fluidization chamber comprising a first wall adjacent to the particulate material delivery port and a second wall, separate from the first wall, adjacent to the particulate material supply chamber, and wherein the particulate material fluidization chamber is configured to establish a vortex that mixes the particulate material with the airflow and conveys the particulate material to the particulate material delivery port.

11. The particulate material delivery system of claim 10, wherein the first wall is opposite the second wall, and wherein the first and second walls are configured to direct the particulate material and the airflow to create the vortex in the particulate material fluidization chamber that mixes the particulate material and the airflow.

12. The particulate material delivery system of claim 10, wherein the first wall is parallel to the second wall.

13. The particulate material delivery system of claim 10, wherein the first wall is oriented at an acute angle with respect to the second wall.

14. The particulate material delivery system of claim 10, wherein the first wall and the second wall are non-parallel and non-perpendicular to a direction of gravity.

15. The particulate material delivery system of claim 10, wherein the second wall of the particulate material fluidization chamber at least partially defines the particulate material supply chamber.

\* \* \* \* \*